(12) United States Patent
Katzir et al.

(10) Patent No.: US 12,535,769 B2
(45) Date of Patent: Jan. 27, 2026

(54) SYSTEMS AND METHODS FOR RECONSTRUCTION OF DIGITAL HOLOGRAMS

(71) Applicant: Orbotech Ltd., Yavne (IL)

(72) Inventors: Yigal Katzir, Rishon le Zion (IL); Boaz Rosenberg, Gadera (IL); Nir Turko, Rehovot (IL)

(73) Assignee: Orbotech Ltd., Yavne (IL)

( * ) Notice: Subject to any disclaimer, the term of this patent is extended or adjusted under 35 U.S.C. 154(b) by 479 days.

(21) Appl. No.: 18/013,112

(22) PCT Filed: Jun. 17, 2021

(86) PCT No.: PCT/IL2021/050733
§ 371 (c)(1),
(2) Date: Dec. 27, 2022

(87) PCT Pub. No.: WO2022/013850
PCT Pub. Date: Jan. 20, 2022

(65) Prior Publication Data
US 2023/0259070 A1    Aug. 17, 2023

Related U.S. Application Data

(60) Provisional application No. 63/050,806, filed on Jul. 12, 2020.

(51) Int. Cl.
*G03H 1/04* (2006.01)
*G01B 9/02* (2022.01)
*G01B 9/02055* (2022.01)

(52) U.S. Cl.
CPC ....... *G03H 1/0443* (2013.01); *G01B 9/02047* (2013.01); *G01B 9/02078* (2013.01)

(58) Field of Classification Search
CPC .............. G03H 1/0443; G01B 9/02047; G01B 9/02078; G01B 11/2441
See application file for complete search history.

(56) References Cited

U.S. PATENT DOCUMENTS

| | | |
|---|---|---|
| 5,404,221 A | 4/1995 | de Groot |
| 6,262,818 B1 | 7/2001 | Cuche et al. |
| 8,780,334 B1 | 7/2014 | De Groot |
| 2010/0002950 A1* | 1/2010 | Arieli ..................... G01B 11/24 702/167 |
| 2016/0290782 A1 | 10/2016 | Girshovitz et al. |
| 2019/0011882 A1* | 1/2019 | Gusyatin ............ G01N 15/1433 |

FOREIGN PATENT DOCUMENTS

| | | |
|---|---|---|
| CN | 102866494 A | 1/2013 |
| JP | 2005326249 A | 11/2005 |

(Continued)

OTHER PUBLICATIONS

WIPO, ISR for PCT/IL2021/050733, Sep. 19, 2021.
(Continued)

*Primary Examiner* — John R Wallace
(74) *Attorney, Agent, or Firm* — Hodgson Russ LLP

(57) ABSTRACT

A method for reconstructing a digital hologram of a surface having at least one three-dimensional feature thereon, including acquiring a digital hologram of the surface, reconstructing a wavefront based on the digital hologram, generating a phase map of at least a portion of the surface based on the wavefront, the phase map including phase ambiguities, obtaining at least one additional image of the surface, obtaining height data relating to the three-dimensional feature from the at least one additional image of the surface, the height data being obtained with a first precision, resolving the phase ambiguities based on the height data and deriving a height of the at least one three-dimensional feature based on the phase map following the resolving of the phase ambiguities therein, the height being derived with a second precision more precise than the first precision.

14 Claims, 11 Drawing Sheets

(56) References Cited

FOREIGN PATENT DOCUMENTS

| JP | 2007533977 A | 11/2007 |
|----|--------------|---------|
| JP | 2009020448 A | 1/2009  |
| JP | 2019537726 A | 12/2019 |
| TW | 200916985 A  | 4/2009  |
| TW | 201007393 A  | 2/2010  |

OTHER PUBLICATIONS

Dennis C. Ghiglia et al., Chapter 2: Line Integrals, Residues, and 2-D Phase Unwrapping, Two-Dimensional Phase Unwrapping Theory, Algorithms, and Software, 1998, Wiley-Interscience Publication, John Wiley & Sons, Inc., pp. 31-58.
TIPO, Office Action issued in TW Patent Application No. 110123318, Dec. 6, 2024.
Van Rooij et al., "Sub-millimeter depth-resolved digital holography," Applied Optics, Sep. 1, 2017, vol. 56, No. 25, pp. 7286-7293.
Wu et al., "Extended depth-of-field in holographic imaging using deep-learning-based autofocusing and phase recovery," Optica, May 29, 2018, vol. 5, No. 6, pp. 704-710.
Mcelhinney et al., "Extended focused imaging for digital holograms of macroscopic three-dimensional objects," Applied Optics, Jul. 1, 2008, vol. 47, No. 19, pp. D71-D79.
JPO, Office Action issued in Japanese Patent Application No. 2023-501602, Mar. 11, 2025.

* cited by examiner

SYSTEMS AND METHODS FOR RECONSTRUCTION OF DIGITAL HOLOGRAMS

CROSS-REFERENCE TO RELATED APPLICATIONS

This application claims priority to the provisional patent application filed Jul. 12, 2020 and assigned U.S. App. No. 63/050,806, the disclosure of which is hereby incorporated by reference.

FIELD OF THE INVENTION

The present invention relates generally to digital holography and more particularly to reconstruction of digital holograms.

BACKGROUND OF THE INVENTION

Various systems and methods for the reconstruction of digital holograms are known in the art.

SUMMARY OF THE INVENTION

The present invention seeks to provide novel systems and methods for the resolution of phase ambiguities in the reconstruction of digital holograms.

There is thus provided in accordance with an embodiment of the present invention a method for reconstructing a digital hologram of a surface having at least one three-dimensional feature thereon, including acquiring a digital hologram of the surface, reconstructing a wavefront based on the digital hologram, generating a phase map of at least a portion of the surface based on the wavefront, the phase map including phase ambiguities, obtaining at least one additional image of the surface, obtaining height data relating to the three-dimensional feature from the at least one additional image of the surface, the height data being obtained with a first precision, resolving the phase ambiguities based on the height data and deriving a height of the at least one three-dimensional feature based on the phase map following the resolving of the phase ambiguities therein, the height being derived with a second precision more precise than the first precision.

According to one embodiment of the present invention, the obtaining at least one additional image of the surface includes digitally propagating the wavefront through a series of depths within the surface and obtaining a series of digital wavefronts corresponding to the series of depths.

The obtaining height data includes employing DFF algorithms to obtain height data based on the series of digital wavefronts.

According to another embodiment of the present invention, the obtaining at least one additional image of the surface includes employing an AI network to generate a series of incoherent light images corresponding to a series of digital wavefronts of the surface, the series of digital wavefronts being obtained by digitally propagating the wavefront through a series of depths within the surface and obtaining the series of digital wavefronts corresponding to the series of depths.

The obtaining height data includes employing DFF algorithms to obtain height data based on the series of incoherent light images.

In accordance with still another embodiment of the present invention, the obtaining at least one additional image of the surface includes acquiring at least one incoherently illuminated image of the surface.

The obtaining height data includes employing an AI network to automatically obtain height data based on segmentation and classification of the at least one three-dimensional feature.

The first precision is in a range of 1~5 μm.

Additionally, the second precision is in a range of 1~100 nm or 50~1000 nm.

The acquiring the digital hologram includes acquiring a digital microscopic hologram.

There is further provided in accordance with another embodiment of the present invention a system for reconstructing a digital hologram of a surface having at least one three-dimensional feature thereon, including a digital holographic image acquisition subsystem operative for acquiring a digital hologram of the surface, a wavefront reconstructor operative to reconstruct a wavefront based on the digital hologram, a phase map generator operative to receive the wavefront and to generate a phase map of at least a portion of the surface based on the wavefront, the phase map including phase ambiguities, an additional image acquisition subsystem or image processing subsystem operative to obtain at least one additional image of the surface, an image analyzer operative to obtain height data relating to the three-dimensional feature from the at least one additional image of the surface, the height data being obtained with a first precision, a phase ambiguity resolver operative to resolve the phase ambiguities in the phase map based on the height data and a height calculator operative to derive a height of the at least one three-dimensional feature based on the phase map following the resolving of the phase ambiguities therein, the height of the three-dimensional feature being derived with a second precision more precise than the first precision.

In accordance with an embodiment of the present invention, the imaging processing subsystem is operative to digitally propagate the wavefront through a series of depths within the surface and to obtain a series of digital wavefronts corresponding to the series of depths.

The image analyzer is operative to employ DFF algorithms to obtain the height data based on the series of digital wavefronts.

In accordance with another embodiment of the present invention, the image processing subsystem includes an AI network operative to generate a series of incoherent light images corresponding to a series of digital wavefronts of the surface, the series of digital wavefronts being obtained by the image processing subsystem digitally propagating the wavefront through a series of depths within the surface and obtaining the series of digital wavefronts corresponding to the series of depths.

The image analyzer is operative to employ DFF algorithms to obtain the height data based on the series of incoherent light images.

In accordance with still another embodiment of the present invention, the additional image acquisition subsystem includes an incoherent illuminator operative to illuminate the surface with incoherent light and a camera operative to acquire the at least one additional image of the surface.

The image analyzer includes an AI network operative to automatically obtain height data based on segmentation and classification of the at least one three-dimensional feature.

The first precision is in a range of 0.5~5 μm.

Additionally, the second precision is in a range of 1~100 nm or 50~1000 nm.

The digital holographic image acquisition subsystem is a digital holographic microscopic image acquisition subsystem.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
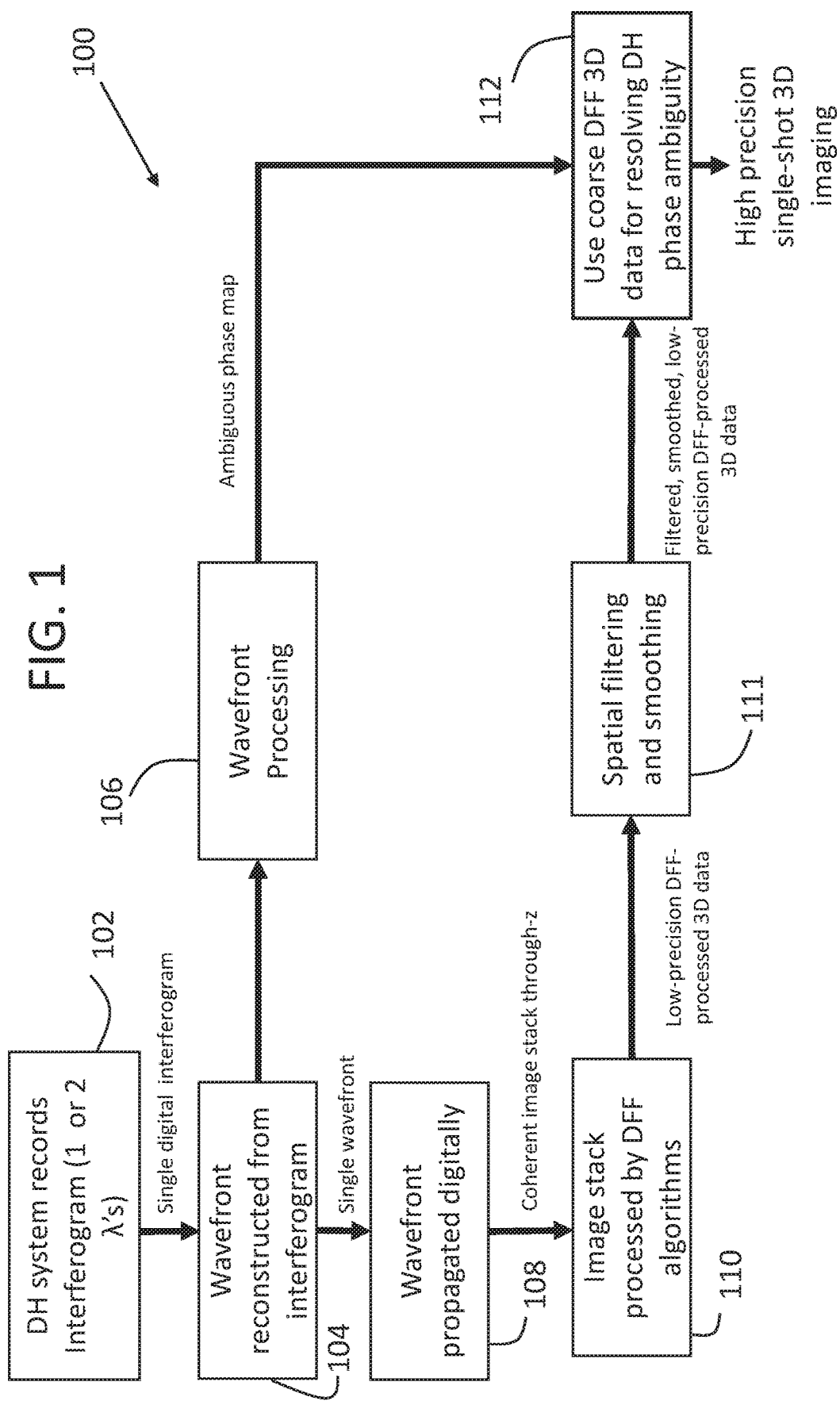
FIG. 1 is a simplified high level flow chart illustrating steps in the reconstruction of digital holograms, in accordance with an embodiment of the present invention.

Reference is now made to FIG. 1, which is a simplified high level flow chart illustrating steps in the reconstruction of digital holograms, in accordance with an embodiment of the present invention.

As seen in FIG. 1, a process 100 for the reconstruction of digital holograms may begin at a first image acquisition step 102, whereat a digital holographic (DH) image acquisition system records a digital hologram. The digital hologram, also termed an interferogram, is a digital recording of an interference pattern created by the interference of coherent light reflected by a three-dimensional object being imaged, with reference light. The interferogram is recorded by an electronic sensor and comprises a multiplicity of pixels. By way of example, the DH system recording the digital hologram may be a digital holographic microscopy system (DHM), as is shown and described in more detail henceforth with reference to FIG. 10. The interferogram may be acquired using one, two or more wavelengths of coherent light. Two or more wavelengths may be used in order to reduce although not eliminate phase ambiguities in the phase information recorded in the interferogram.

As seen at a second wavefront reconstruction step 104, a wavefront is then reconstructed based on the interferogram. The wavefront is not a physical entity but rather a numerical entity, commonly referred to as complex amplitude, in which the phase and amplitude information at each pixel in the interferogram is encoded. The wavefront is typically computationally reconstructed, for example by computing functionality included in an image processing module, as is shown and described in more detail henceforth with reference to FIG. 10. Reconstruction algorithms in digital holographic microscopy can include the Fresnel transform algorithm, angular spectrum algorithm, and convolution algorithm, all based on fast-Fourier-transform (FFT).

As seen at a third wavefront processing step 106, the wavefront obtained at step 104 is processed in order to generate a phase map of the imaged object. The phase map corresponds to the phase information encoded in the complex amplitude per pixel, based on which phase information the imaged object may be numerically reconstructed. The phase information per pixel may be obtained from the wavefront by calculating the angle of the phasor encoded in the complex amplitude per pixel.

The phase map generated at step 106 typically includes phase discontinuity artefacts, that are not representative of the true shape of the three dimensional imaged object. These discontinuities by multiples of $2\pi$ arise due to wrapping of the computed phase within the interval $(-\pi, \pi)$. In other words, the phase map is ambiguous modulo $(2\pi)$. The phase map may thus be termed an ambiguous phase map. The use of dual or multiple wavelengths for hologram recording may greatly reduce the number of discontinuities, since in that case the $2\pi$ ambiguity applies only to the phase difference between the multiple wavelengths. Notwithstanding the use of single or multiple wavelengths for holograph recording, this ambiguity in the phase map results in corresponding ambiguities in dimensions of the imaged object to be derived based on the phase map, since a shift in phase in the phase map may correspond to a shift of any number of integer multiples of the wavelength. Such ambiguities must therefore be resolved, and the true phase shift ascertained without ambiguities, in order to accurately numerically reconstruct the structure of the imaged object based on the phase map.

It is a particular feature of the present invention that, in accordance with embodiments of the present invention, phase ambiguities in the phase map are resolved, allowing the generation of an unambiguous phase map and hence highly accurate, high precision numerical reconstruction of the height dimensions of the imaged object. The unambiguous phase map generated in accordance with embodiments of the present invention may be a full phase map, for numerical reconstruction of the whole of the imaged object, or a partial phase map for numerical reconstruction of one or more features of the imaged object, in order to allow derivation of the heights of the one or more features. This can be achieved in the present invention by the use of height information derived from at least one additional image of the imaged object in order to resolve the phase ambiguities. That additional image may either be an actual physically acquired image or a virtual computationally derived image representation. The height information derived from the at least one additional image of the imaged object is typically of lower precision and has poorer axial resolution along an imaging optical axis (such as optical axis A of FIG. 10) than the height information relating to the imaged object to be ultimately derived based on the DH image. However, the height information derived from the at least one additional image is of sufficiently high precision to be used in resolving the phase ambiguity in the phase map, by assisting in the identification of the number of wavelength multiples, or synthetic wavelength multiples in the case of multi-wavelength holography, to which the phase shift corresponds, per pixel of the phase map.

The present invention may be particularly useful in the DH inspection of various types of electronic substrates, such as silicon wafers, PCBs and FPDs. Such electronic substrates are typically formed with three-dimensional (3D) features thereon, in some cases in several layers, which features must be inspected during or following manufacture of the substrate in order to ensure that the features are properly formed. In accordance with embodiments of the present invention, these 3D features may be rapidly and highly accurately measured using DH inspection systems, without ambiguity.

Figure 10:
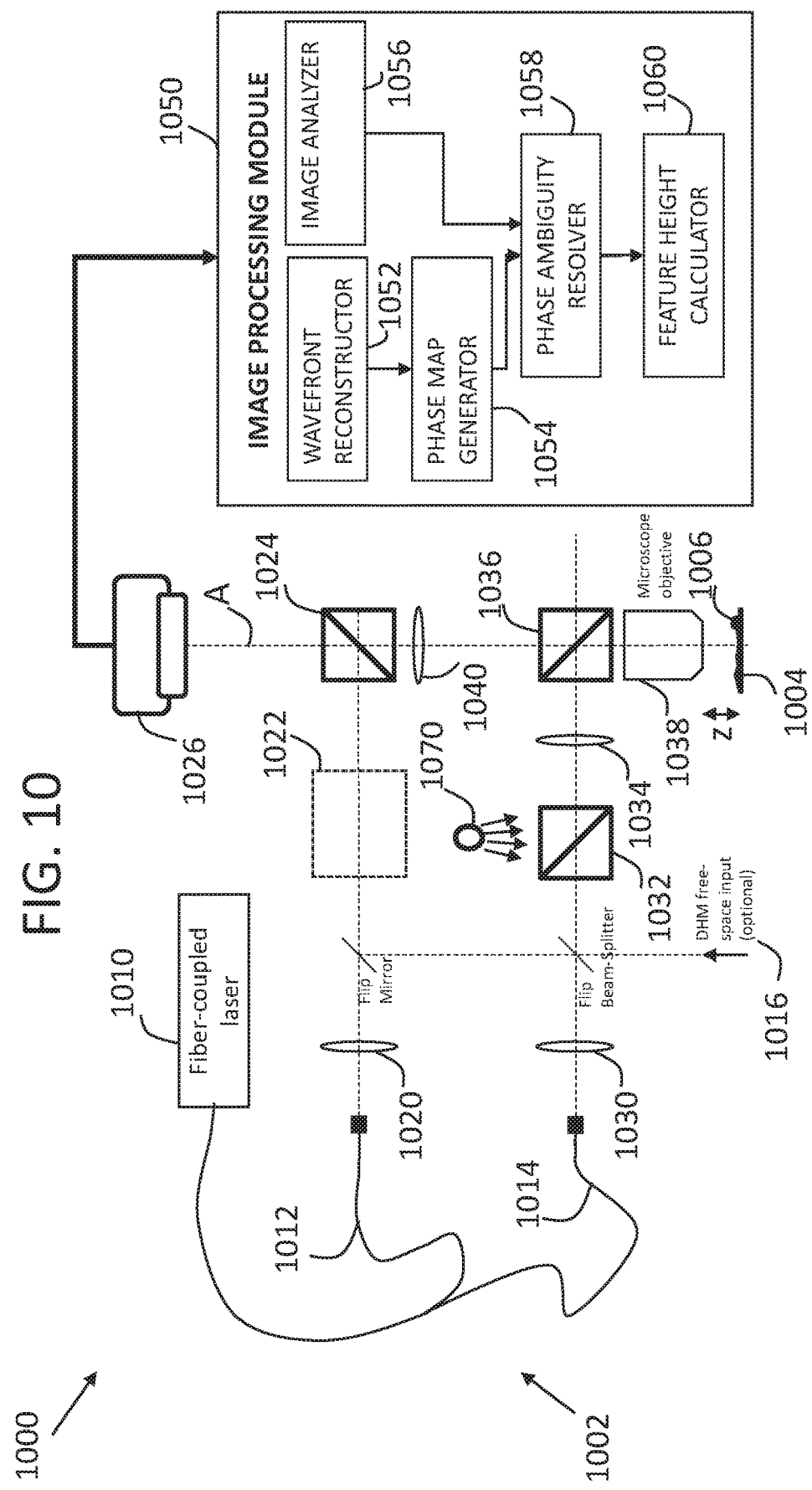
FIG. 10 is a simplified partially pictorial, partially block diagram illustration of a system for acquisition and reconstruction of digital holograms, constructed and operative in accordance with an embodiment of the present invention, for performing the steps included in any of FIGS. 1-8.

In accordance with one embodiment of the present invention, the at least one additional image, in addition to the wavefront reconstructed at step 104, may be a stack of images obtained by digitally propagating the wavefront obtained at step 104 through a series of depths in the imaged object. The single wavefront (either one of the two reconstructed wavefronts in the dual wavelength case) obtained at step 104 thus may be digitally propagated to obtain image information relating to different depths within the imaged object. The depth of the imaged object may be defined as the dimension of the object in the z-direction, where the z-direction is that direction perpendicular to the x- and y-axis defining the object or surface plane. The z-direction is indicated in FIG. 10. The image out of the stack of images through z having the optimum focus may then be identified per pixel. The optimum focal distance per pixel may then be used to derive the object height at each pixel vicinity. The object height so derived may be used to resolve ambiguity in the phase map. This embodiment of the present invention is shown in FIG. 1.

In accordance with another embodiment of the present invention, the at least one additional image, in addition to the wavefront reconstructed at step 104, may be a stack of computationally derived incoherent light image equivalents corresponding to a stack of images obtained by digitally propagating the wavefront obtained at step 104 through a series of depths within the imaged object. The single wavefront obtained at step 104 may be digitally propagated to obtain image information relating to different depths within the imaged object. The depth of the imaged object may be defined as the dimension of the object in the z-direction, where the z-direction is that direction perpendicular to the x- and y-axis defining the object or surface plane. The z-direction is indicated in FIG. 10. An artificial intelligence (AI) network may then be trained to perform computation equivalent to optical cross-modality image transformation. The AI network thus acts on the stack of coherent light images obtained by digitally propagating the wavefront through various object depths so as to generate a stack of corresponding images resembling those obtained with incoherent (also referred to as "white") light. The image out of the stack of AI-generated incoherent light images through z having the optimum focus may then be identified, per pixel. The optimum focal distance per pixel may then be used to derive the object height at each pixel vicinity. The object height so derived may be used to resolve ambiguity in the phase map. This embodiment of the present invention is shown in FIG. 2.

Figure 2:
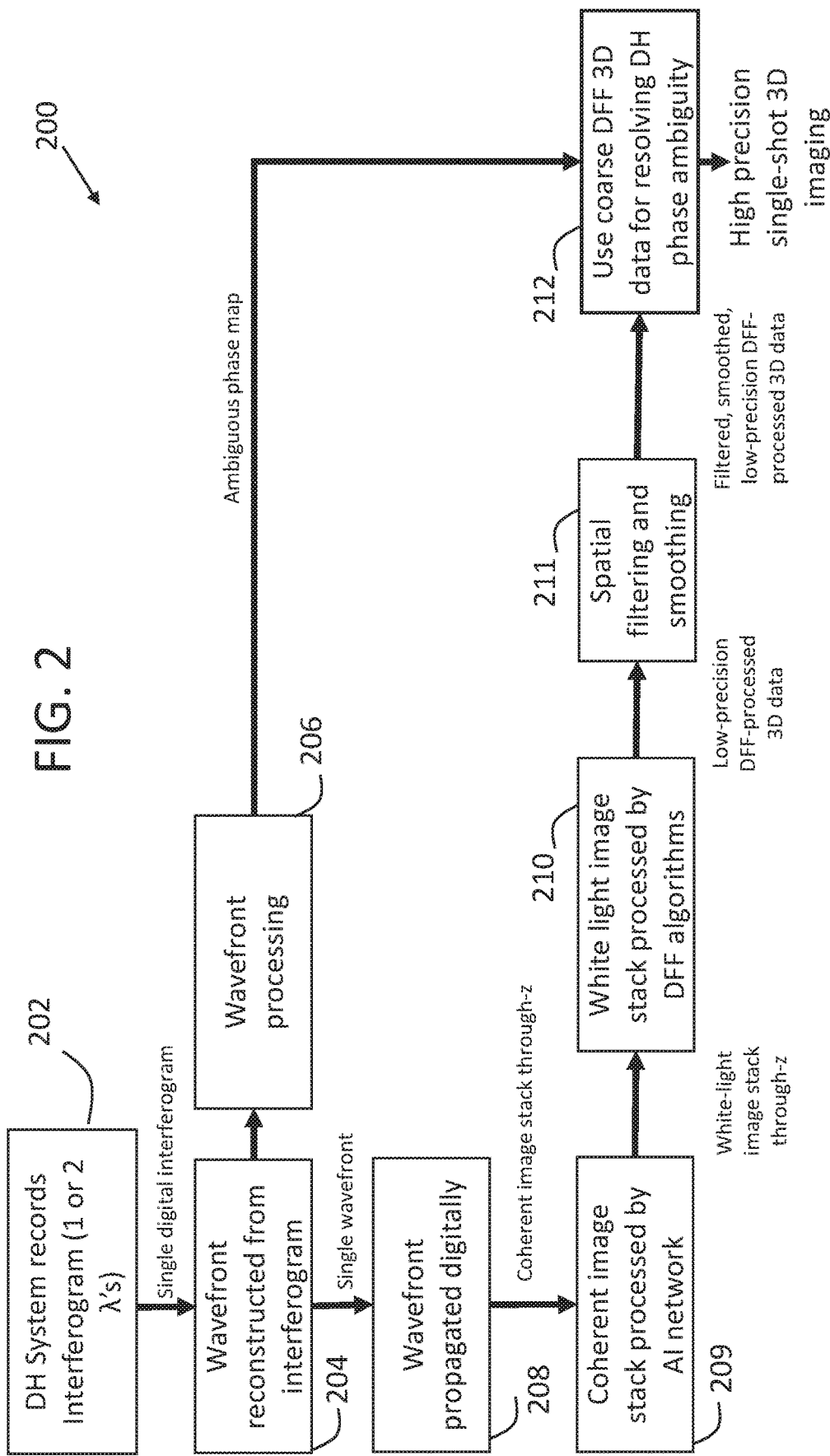
FIG. 2 is a simplified high level flow chart illustrating steps in the reconstruction of digital holograms, in accordance with another embodiment of the present invention.
Figure 3:
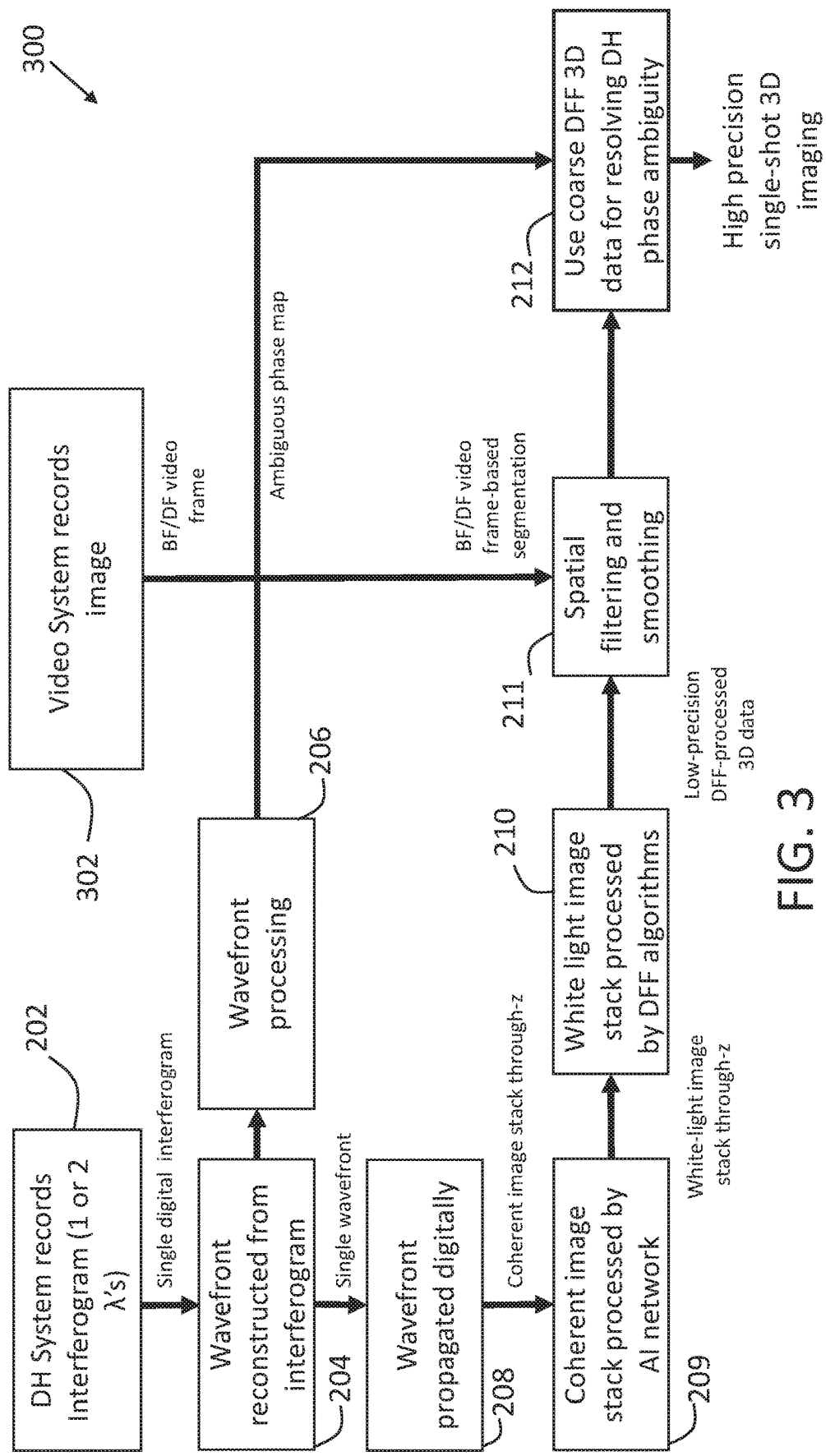
FIG. 3 is a simplified high level flow chart illustrating steps in the reconstruction of digital holograms, in accordance with yet another embodiment of the present invention.

In accordance with yet another embodiment of the present invention, the embodiment of the present invention shown in FIG. 2 may be augmented by the actual physical recording of an incoherent light image of the imaged object, in addition to the AI-generated stack of equivalent incoherent light images. The incoherent light image may be used to assist in the spatial filtering and smoothing of the height values derived per pixel vicinity, in order to improve the resolving of ambiguities in the phase map. This embodiment of the present invention is shown in FIG. 3.

In accordance with another embodiment of the present invention, the at least one additional image, in addition to the wavefront reconstructed at step 104, may be an incoherent light image of the imaged object. For example, the imaged object may be a surface having at least one three-dimensional feature thereon. The incoherent light image of the imaged object may be segmented, in order to identify the presence and delineate the boundaries of discontinuities in the surface. These discontinuities may correspond to desirable and deliberately formed three-dimensional features on the surface, or to discontinuities in the surface due to defects in the surface. Since the surface is generally flat, features on the surface deviating from the generally flat surface topography by more than a predetermined threshold may be considered to be surface discontinuities. These discontinuities may be termed bumps, although it is understood that the discontinuities may be a protuberance or indentation with respect to the surface having any type of shape, such as curved or rounded or having straight edges.

Figure 5:
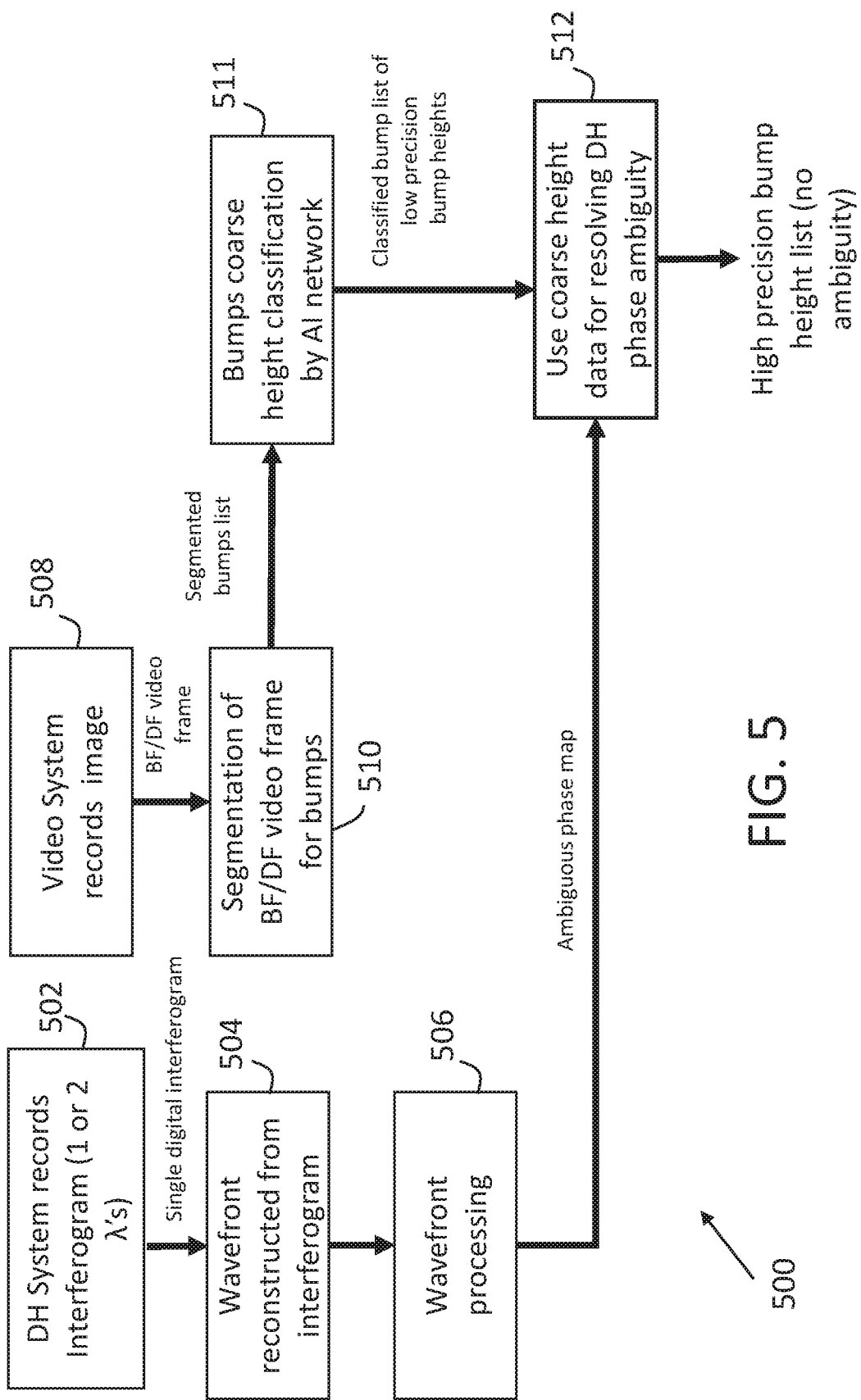
FIG. 5 is a simplified high level flow chart illustrating steps in the reconstruction of digital holograms, in accordance with a further embodiment of the present invention.
Figure 6:
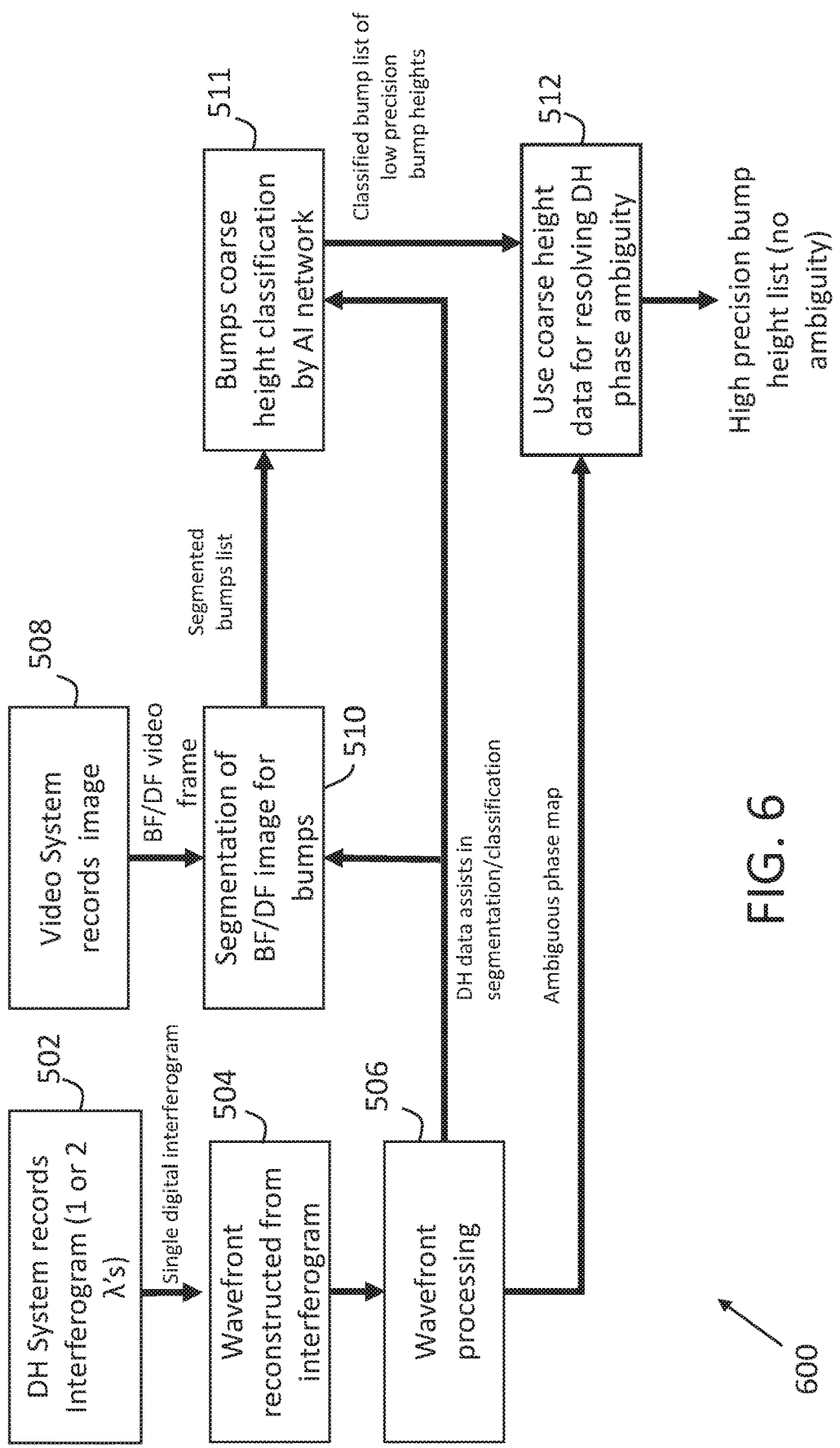
FIG. 6 is a simplified high level flow chart illustrating steps in the reconstruction of digital holograms, in accordance with a still further embodiment of the present invention.

In accordance with this embodiment of the present invention, the segmented additional incoherent light image may be processed by an AI-network in order to classify the height of the bumps. The bump height so derived may be used to resolve ambiguity in the phase map. This embodiment of the present invention is shown in FIGS. 5 and 6. This embodiment of the present invention is particularly useful for the imaging of surfaces upon which multiple discontinuities may be present.

It is understood that the term height as used herein may refer to a positive or negative height, meaning that a given feature appearing in a given pixel may be a protruding feature having a positive height or an indented feature having a negative height with respect to neighboring features. It is noted that in actual applications to electronic substrate inspection, the absolute height derived according to the teaching of the present invention is ultimately related to some other feature of that substrate. Thus, in the case of a wafer bump, the wafer bump height may be measured relative to other neighboring bumps or relative to a reference feature in the lateral vicinity of the bump such as a metallic layer, which can be referred to as under bump metallization (UBM).

The approach of the present invention avoids the use of conventional phase unwrapping techniques for resolving phase ambiguities, which conventional techniques are typically very slow, highly computationally demanding and highly sensitive to system conditions, often leading to poor results. Examples of such conventional phase unwrapping techniques may be found in 'Two-Dimensional Phase Unwrapping: Theory, Algorithms, and Software', D. C. Ghiglia and M. D. Pritt, Wiley, New York (1998), the contents of which are hereby incorporated herein by reference.

Furthermore, such conventional algorithmic phase unwrapping techniques rely on surface continuities in order to perform the phase unwrapping. In cases where the imaged object or surface is highly discontinuous and the height difference between neighboring imaged points exceeds the unambiguous phase shift range, i.e. $2\pi$, such conventional techniques fail in resolving phase ambiguity correctly. In contrast, in accordance with embodiments of the present invention, ambiguities in the phase map may be resolved even in the case of severe surface discontinuities involving phase jumps greater than 2π, since the present invention does not rely on surface continuities in order to resolve phase ambiguities.

In accordance with embodiments of the present invention, phase ambiguities may be rapidly resolved using lower precision or coarser additional data, provided that the additional height data in itself possesses an effective range extending over the entire object depth of interest, and the precision thereof is high enough to be useful in resolving the phase ambiguity. The additional data can have an effective range extending over several multiples of the unambiguous DH range, such that the additional data serves to extend the effective overall measuring range of the system of the present invention, without loss of precision in the derived height data. The height information ultimately provided by the present invention thus retains the high precision and resolution of the DH image data, without loss of accuracy, notwithstanding that such height information is obtained with the assistance of possibly poorer precision height information.

It is noted that the various embodiments of the present invention described herein have a finite effective range beyond which range the quality of the additional height data is degraded. Moreover, embodiments described with reference to FIGS. 5 and 6 may also have their own ambiguity, for example, between being above or below the sharp focusing plane.

It is appreciated that although the unambiguous phase shift range of multiple wavelength DH may be theoretically indefinitely extended, as the wavelength difference between the multiple wavelengths approaches zero, this is at the expense of loss of accuracy of the DH data. Advantageously, no such loss occurs in accordance with the present invention.

Furthermore, in some embodiments of the present invention, the DH imaging has a long measuring range due to propagation of the DH image through the depth dimension of the imaged object.

Additionally, the present invention in some embodiments thereof uses a combination of the phase information derivable from the DH image with height information derivable from AI processed images. The present invention thus may be partially but is not entirely in the realm of AI and the results are not solely based on AI generated images. This mitigates the risk of a false output, which would be the case should the height information be derived based only on AI-generated images.

Returning to FIG. 1, following the reconstruction of the wavefront at step 104, the wavefront can be digitally propagated at step 108, thereby generating a plurality of 2D images corresponding to a plurality of focal depths in the z direction through the imaged object. Each image of the plurality of images can comprise a multiplicity of pixels. The plurality of images form a stack of coherent light images at a series of depths in the imaged object. It is noted that the term 'image' is used herein in a generalized sense, as the computed wavefronts actually are arrays of complex numbers, contrary to conventional digital image representations consisting of encoded real numbers. For subsequent processing stages such as DFF algorithms the complex wavefront may be converted to a real image e.g. by taking the modulus value at each pixel. The single wavefront reconstructed at step 104 thus may be digitally propagated to obtain image information relating to different depths within the imaged object. The depth of the imaged object may be defined as the dimension of the object in the z-direction, where the z-direction is that direction perpendicular to the x- and y-axis defining the object plane.

For example, in the case of the imaged object being a surface having three dimensional features thereon, the entire z-dimension of the imaged object may be 10~100 μm and a stack comprising a series of approximately 20 images may be reconstructed at intervals of 0.5-5 μm in the z-direction. More generally, the image stack output at step 108 may comprise any number of images separated by any suitable depth range interval, provided that the height measurements derivable based on the image stack are of a precision higher than the phase non-ambiguity range, such that the height measurements may be used to resolve the phase ambiguity in the phase map output at step 106. As seen at image processing step 110, the stack of images through the z-direction can be processed in order to find the optimum focused image on a pixel by pixel basis, the optimum focused image being selected from the stack of images. By way of example, the image stack output at step 108 may be processed by Depth from Focus (DFF), also referred to as passive autofocus algorithms, in order to identify the optimum focused image per pixel. Autofocusing algorithms employed in DHM vary with respect to the sharpness metrics and acceleration techniques used to speed up convergence to the optimum image frame at each pixel vicinity. These algorithms may differ somewhat from DFF algorithms employed in incoherent imaging, being adapted to the particular high spatial frequency behavior of coherent imagery.

Based on the optimum focal depth per pixel, the height of the imaged feature appearing in each pixel may be found. For example, in the case that the imaged object is a surface having at least one three-dimensional feature thereon, the height of the three-dimensional feature on the surface and appearing in each pixel may be found. The height of the three-dimensional feature may be defined as the dimension of the three-dimensional feature extending in a direction perpendicular to the plane defined by the surface upon which the three-dimensional feature is formed. The height of the object, such as the height of a three-dimensional feature on an imaged surface, can be found according to this approach with a first precision. By way of example, the precision with which the height per pixel is found based on employing DFF algorithms may be 1~5 μm. This precision is a relatively low precision which may be unacceptably poor for actual height measurements. However, this precision is sufficiently high for assisting in resolving of phase ambiguities in the phase map, as is further detailed henceforth.

As seen at a further step 111, the outputting of DFF processed 3D data at step 110 can be followed by spatial filtering and smoothing. As is appreciated by one skilled in the art, the direct DFF object height derived at step 110 is often redundant and noisy and therefore benefits from spatial filtering and smoothing. For example, a PSF adapted filter may be used for this step. It is appreciated that the smoothing and filtering step 111 improves results but is not essential, and may be omitted if the quality of spatial resolution achieved at step 110 is considered to be sufficiently good.

As seen at a phase ambiguity resolution step 112, the low-precision processed DFF data, as smoothed and filtered by step 111, may then be used to resolve phase ambiguity in the phase map generated at step 106.

The per-pixel decision for resolving phase ambiguity is made based on the extended range, albeit lower precision DFF or otherwise processed data, which extended range data is used to unwrap the phase data, by identifying to which multiple of ambiguous range wavelengths the measured phase shift corresponds. In other words, which integer multiple of $2\pi$ is the correct one is ascertained. As a result, a high precision height image may be obtained, no longer including ambiguities. The final high precision map is typically of a second, greater precision than the first, typically lower precision of the additional image used for assisting in the resolving of the phase ambiguities.

For example, a given phase shift may correspond to a phase difference of $\pi/2$, $\pi/2\pm2\pi$, $\pi/2\pm4\pi$, etc. all differing by integer multiples of $2\pi$. Such a phase shift may therefore be termed an ambiguous phase shift, such that the height of the object at the pixel at which the phase shift is measured, which height is derived based on the phase shift, is also ambiguous.

This may be exemplified with regards to a dual wavelength laser employed for DH, emitting at wavelengths of 0.520 µm and 0.532 µm. These wavelengths result in an ambiguity range, also referred to as synthetic wavelength of 23 µm, given by (0.52×0.532)/(0.532-0.52), over which optical path length a $2\pi$ phase shift is accrued between these two adjacent wavelengths. With a normal incidence interferometer, an ambiguous $\pi/2$ wavefront phase difference at a given pixel may thus translate to an ambiguous series of corresponding possible object heights approximately given by 2.9, 2.9±11.5, 2.9±23 µm, etc., all differing by integer multiples of 11.5 µm corresponding to one synthetic wavelength path difference for incident light. Each candidate height may, depending on the system noise level, be precise down to about 1-100 nm in the case of single wavelength interferometry and to about 50-1000 nm in the case of dual wavelength interferometry, but the system at step 106 is unable to ascertain which the correct height is from amongst the various possible candidate heights. However, at step 112 the extended range, low-precision data relating to the height of the object at the given pixel may be used to resolve the ambiguity, since the extended range, low-precision height data may be used to ascertain which height of the several ambiguous range height possibilities corresponds to the low-precision height.

To further illustrate this last point, suppose at the given pixel with the $\pi/2$ phase shift the DFF algorithm of step 110 after smoothing at step 111 reports a height such as 28.7 µm with ±5 µm uncertainty. Comparison with the series of candidate possible heights as output by step 106 yields 2.9+23=25.9 µm as the nearest value, with all other possible candidate heights being outside the DFF uncertainty range. Since the DH data is the more precise one, the system then reports 25.9 µm as the best accuracy height estimate for the given pixel.

Reference is now made to FIG. 2, which is a simplified high level flow chart illustrating steps in the reconstruction of digital holograms, in accordance with an embodiment of the present invention.

As seen in FIG. 2, a process 200 for the reconstruction of digital holograms may begin at a first image acquisition step 202, whereat a digital holographic image acquisition system (DH) system records a digital hologram. The digital hologram, also termed an interferogram, is a digital recording of an interference pattern created by the interference of coherent light reflected by a three-dimensional object being imaged, with reference light. The interferogram is recorded by an electronic sensor and comprises a multiplicity of pixels. By way of example, the DH system recording the digital hologram may be a digital holographic microscopy system (DHM), as is shown and described in more detail henceforth with reference to FIG. 10. The interferogram may be acquired with one, two or more wavelengths of coherent light. Two or more wavelengths may be used in order to reduce although not eliminate phase ambiguities in the phase information included in the interferogram.

As seen at a second wavefront reconstruction step 204, a wavefront is then reconstructed based on the interferogram. The wavefront is not a physical entity but rather a numerical entity, commonly referred to as a complex amplitude, in which the phase and amplitude information at each pixel in the interferogram is encoded. The wavefront is typically computationally reconstructed, for example by computing functionality included in an image processing module, as is shown and described in more detail henceforth with reference to FIG. 10. Reconstruction algorithms in digital holographic microscopy can include the Fresnel transform algorithm, angular spectrum algorithm, and convolution algorithm, all based on fast-Fourier-transform (FFT).

As seen at a third wavefront processing step 206, the wavefront obtained at step 204 can be processed in order to generate a phase map of the imaged object. The phase map corresponds to the phase information encoded in the complex amplitude per pixel, based on which phase information the imaged object may be numerically reconstructed. The phase information per pixel may be obtained from the wavefront by calculating the angle of the phasor encoded in complex amplitude per pixel.

The phase map generated by step 206 typically includes phase discontinuity artefacts that are not representative of the true shape of the three dimensional imaged object. These discontinuities by multiples of $2\pi$ arise due to wrapping of the computed phase within the interval ($-\pi$, $\pi$). In other words, the phase map is ambiguous modulo ($2\pi$). The phase map thus may be termed an ambiguous phase map.

The use of dual or multiple wavelengths for hologram recording may greatly reduce the number of discontinuities, since in that case the $2\pi$ ambiguity applies only to the phase difference between the multiple wavelengths. This ambiguity in the phase map results in corresponding ambiguities in dimensions of the imaged object derived based on the phase map, since a shift in phase in the phase map may correspond to a shift of any number of integer multiples of the wavelength. Such ambiguities must therefore be resolved, and the true phase shift ascertained without ambiguities, in order to accurately numerically reconstruct the structure of the imaged object based on the phase map.

In order to resolve the phase ambiguities, the wavefront can be propagated digitally at a step 208, thereby generating a plurality of images corresponding to a plurality of focal depths in the z direction through the imaged object. Each image of the plurality of images can comprise a multiplicity of pixels. The plurality of images form a stack of coherent light images at a series of depths in the imaged object. The single wavefront obtained at step 204 thus may be digitally propagated to obtain image information relating to various different depths within the imaged object. The depth of the imaged object may be defined as the dimension of the object in the z-direction, where the z-direction is that direction perpendicular to the x- and y-axis defining the object or surface plane.

For example, in the case of the imaged object being a surface having three dimension features thereon, the entire z-dimension of the imaged object may be 10~100 µm and a stack comprising a series of approximately 20 images may be reconstructed at intervals of 0.5-5 µm in the z-direction. More generally, the image stack output at step 208 may comprise any number of images separated by any suitable depth range interval, provided that the height measurements derivable based on the image stack are of a precision higher than the phase non-ambiguity range, such that the height measurements may be used to resolve the phase ambiguity in the phase map output at step 206.

As seen at an AI-network processing step 209, the image stack output at step 208 is then transformed into a stack of equivalent incoherent light 2D images at the same series of depths. This transformation can be carried out by a trained AI-network, for example a CNN. Further details relating to the training and structure of such a network are provided henceforth with reference to FIG. 4.

As seen at an image processing step 210, the stack of incoherent light images through the z-direction can be further processed in order to find the optimum focused image on a pixel by pixel basis, the optimum focused image being selected from the stack of images. By way of example, the image stack output at step 209 may be processed by DFF algorithms in order to identify the optimum focused image per pixel. Autofocusing algorithms employed in DHM vary with respect to the sharpness metrics and acceleration techniques used to speed up the convergence to the optimum image frame at each pixel vicinity. The availability at step 209 of an equivalent incoherent image stack can be used to advantage in the present invention by allowing the adoption of more standard DFF algorithms employed in incoherent imaging. Alternatively, other algorithmic approaches for finding the best focused image per pixel may be employed other than DFF, such as Depth from Defocus (DFD). The finding of the optimum focus per pixel at step 210 based on incoherent light images, as described here, rather than based on coherent light images as described at step 110 of FIG. 1, has been found to yield better results. This seems to be due to the better consistent contrast variation behavior through focus of incoherent light images in comparison to DH coherent light images.

Based on the optimum focal depth per pixel, the height of the imaged object appearing in each pixel may be found. For example, in the case that the imaged object is a surface having at least one three-dimensional feature thereon, the height of the three-dimensional feature on the surface and appearing in each pixel may be found. The height of the object, such as the height of a three-dimensional feature on an imaged surface, can be found according to this approach with a first precision. By way of example, the precision with which the height per pixel is found based on employing DFF algorithms may be 1-5 μm. This precision is a relatively low precision which may be unacceptably poor for actual height measurements. However, this precision is sufficiently high for assisting in resolving of phase ambiguities in the phase map, as is further detailed henceforth.

As seen at a further step 211, the output of DFF processed 3D data at step 210 can be followed by spatial filtering and smoothing. As is appreciated by one skilled in the art, the direct DFF object height derived in step 210 is often redundant and noisy and therefore benefits from spatial filtering and smoothing. For example, a PSF adapted filter may be used for this step. The 2D white light equivalent images obtained at step 209 may be used to assist step 211. Those images may advantageously be used to identify and segment the desired 3D features before smoothing. This enables a more efficient use of computing resources resulting in faster processing. Another benefit of use of the 2D white light equivalent images is the prevention of actual sharp feature discontinuities from being artificially blurred by the smoothing algorithm at step 211. It is appreciated that the smoothing and filtering step 211 improves results but is not essential, and may be omitted if the quality of spatial resolution achieved at step 210 is considered to be sufficiently good.

As seen at a phase ambiguity resolution step 212, the low-precision processed DFF data as smoothed and filtered by step 211, may then be used to resolve phase ambiguity in the phase map generated at step 206.

The per-pixel decision for resolving phase ambiguity is made based on the low precision DFF or otherwise processed data, which low precision data is used to resolve ambiguities in the phase data, by identifying to which multiple of ambiguous range wavelengths the measured phase shift corresponds. In other words, which integer multiple of $2\pi$ is the correct one is ascertained. As a result, a high precision height image may be obtained, no longer including ambiguities. The final high precision map is typically of a second, higher precision than the first, lower precision of the additional image used for assisting in the resolving of the phase ambiguities.

For example, a given phase shift may correspond to a phase difference of $\pi/2$, $\pi/2\pm2\pi$, $\pi/2\pm4\pi$, etc. all differing by integer multiples of $2\pi$. Such a phase shift may therefore be termed an ambiguous phase shift, such that the height of the object at the pixel at which the phase shift is measured, which height is derived based on the phase shift, is also ambiguous. However, at step 212 the low-precision data relating to the height of the object at the given pixel may be used to resolve the ambiguity, since the low-precision height data may be used to ascertain which height of the several ambiguous range height possibilities corresponds to the low-precision height. As a result, a high precision height image may be obtained, no longer including ambiguities. The final high precision image is typically of a second, higher precision than the first, lower precision of the additional image used for assisting in the resolution of the phase ambiguities.

In one possible embodiment of the invention, shown in FIG. 3, a process 300 may be implemented generally resembling process 200 of FIG. 2 in relevant aspects thereof, with the difference that process 300 includes an additional image recording step 302, which step 302 is not performed within process 200. Image recording step 302 involves the recording of an incoherently illuminated image or video frame of the imaged item, in addition to the recording of an interferogram of the imaged item. Image recording step 302 may be carried out, for example, by illuminating the imaged object with light of a broad spectral range, generally referred to herein as white light although it may encompass wavelengths outside the visual range, and capturing an image of the illuminated object with a camera or video camera capable of recording incoherent light images, an example of which is described henceforth with reference to FIG. 10. The image may be a bright field (BF) or dark field (DF) image. It is appreciated that an incoherent light image generated by image recording step 302 is an actual captured image, in contrast to the AI-network generated images provided at step 210, which images are virtual, computationally generated images.

As seen in FIG. 3, the incoherent light image acquired at step 302 may be used at step 211, to assist in spatial filtering and smoothing. The use of an incoherent light image for spatial filtering and smoothing step 211 may be advantageous in comparison to the use of only DH data for this step, due to the improved contrast and lower noise provided by the incoherent light image in comparison to the DH image data. The lower-precision processed DFF data, as smoothed and filtered by step 211, may then be used to resolve phase ambiguity in the phase map, as seen at step 212.

Figure 4:
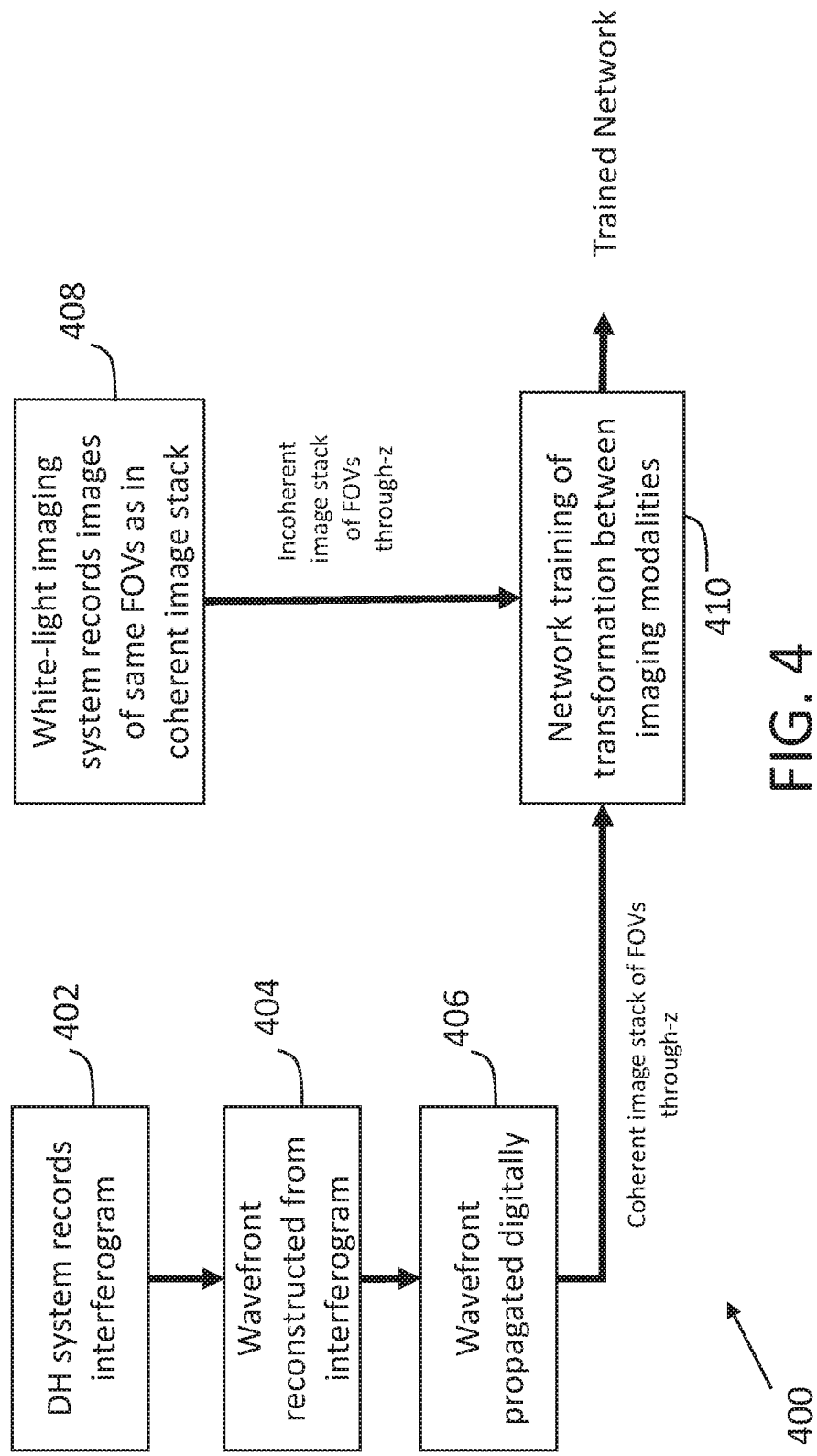
FIG. 4 is a simplified flow chart illustrating training of an AI network employed for the reconstruction of digital holograms in accordance with the embodiments of either of FIGS. 2 and 3.

Reference is now made to FIG. 4, which is a simplified flow chart illustrating training of an AI network employed for the reconstruction of digital holograms in accordance with the embodiments of FIGS. 2 and 3.

As described hereinabove with reference to FIG. 2, a stack of equivalent incoherent light images may be generated at step 210 by an AI-network, based on a stack of corresponding coherent light images. Such a network must be trained prior to the utilization thereof within process 200 or 300, in order for the network to be capable of carrying out image transformation between coherent light images and incoherent light images. The training of such a network is now described with reference to FIG. 4.

As seen in FIG. 4, a training process 400 may begin at a first training step 402, at which a DH system records an interferogram of a 3D object. The interferogram is recorded by an electronic sensor and comprises a multiplicity of pixels. By way of example, the DH system recording the digital hologram may be a digital holographic microscopy system (DHM), as is shown and described in more detail henceforth with reference to FIG. 10. The interferogram may be acquired with one, two or more wavelengths. Two or more wavelengths may be used in order to reduce although not eliminate phase ambiguities in the phase information included in the interferogram.

As seen at a second training step 404, a wavefront is then reconstructed based on the interferogram. The wavefront is not a physical entity but rather a numerical entity in which the phase and amplitude at each pixel in the interferogram is reconstructed. The wavefront is typically computationally reconstructed, for example by computing functionality included in an image processing module, as is shown and described in more detail henceforth with reference to FIG. 10.

As seen at a third training step 406, the wavefront obtained at step 404 can be digitally propagated, thereby generating a plurality of images corresponding to a plurality of focal depths in the z direction through the imaged object. Each image of the plurality of images can comprise a multiplicity of pixels. The plurality of images form a stack of coherent light images at a series of depths in the imaged object. The depth of the imaged object may be defined as the dimension of the object in the z-direction, where the z-direction is that direction perpendicular to the x- and y-axis defining the object or surface plane.

As seen at a fourth training step 408, an incoherent light imaging system records incoherently illuminated images of the same field of views (FOVs) as the FOVs in the coherent image stack output at step 406. For example, the incoherent light imaging system may be a white light microscopy imaging system, as is shown and described in further detail henceforth with reference to FIG. 10. The output of step 408 is a stack of incoherent light images of FOVs in the imaged object along the z-direction through the imaged object.

As seen at a fifth training step 410, the AI network is operative to receive the stacks of coherent and incoherent light images of the same FOVs in the imaged object, respectively output by steps 406 and 408, and is trained to carry out a transformation between the imaging modalities, such that the AI network becomes capable of transforming coherent light images to equivalent incoherent light images.

By way of example, the AI network may be trained on about 10,000 samples, divided into a training set and validation set. The validation set includes samples that are unseen by the network during training. The training set may make up approximately 80% of the samples and the validation set approximately 20%. The network training may be stopped based on at least one of the following criteria: that no further improvement of error (MSE) reduction is achieved upon further training; that overfitting occurs; and that a maximum training epoch is achieved. A large variety of network types may be suitable for use including autoencoders, Unets, residual networks etc. In general, a network suitable for use includes convolutions blocks, data reduction layers and activation/normalization methods.

Reference is now made to FIG. 5, which is a simplified high level flow chart illustrating steps in the reconstruction of digital holograms, in accordance with a further embodiment of the present invention.

As seen in FIG. 5, a process 500 for the reconstruction of digital holograms may begin at a first image acquisition step 502, whereat a digital holographic (DH) image acquisition system records a digital hologram. The digital hologram, also termed an interferogram, is a digital recording of an interference pattern created by the interference of coherent light reflected by a three-dimensional object being imaged, with reference light. The interferogram is recorded by an electronic sensor and comprises a multiplicity of pixels. By way of example, the DH system recording the digital hologram may be a digital holographic microscopy system (DHM), as is shown and described in more detail henceforth with reference to FIG. 10. The interferogram may be acquired with one, two or more wavelengths of coherent light. Two or more wavelengths may be used in order to reduce although not eliminate phase ambiguities in the phase information included in the interferogram.

As seen at a second wavefront reconstruction step 504, a wavefront is then reconstructed based on the interferogram. The wavefront is not a physical entity but rather a numerical entity, commonly referred to as a complex amplitude, in which the phase and amplitude information at each pixel in the interferogram is encoded. The wavefront is typically computationally reconstructed, for example by computing functionality included in an image processing module, as is shown and described in more detail henceforth with reference to FIG. 10. Reconstruction algorithms in digital holographic microscopy can include the Fresnel transform algorithm, angular spectrum algorithm, and convolution algorithm, all based on fast-Fourier-transform (FFT).

As seen at a third wavefront processing step 506, the wavefront obtained at step 504 can be processed in order to generate a phase map of the imaged object. The phase map corresponds to the phase information encoded in the complex amplitude per pixel, based on which phase information the imaged object may be numerically reconstructed. The phase information per pixel may be obtained from the wavefront by calculating the angle of the phasor encoded in the complex amplitude per pixel.

The phase map generated by step 506 typically includes phase discontinuity artefacts that are not representative of the true shape of the three dimensional imaged object. These discontinuities by multiples of $2\pi$ arise due to wrapping of the computed phase within the interval ($-\pi$, $\pi$). In other words, the phase map is ambiguous modulo ($2\pi$). The phase map thus may be termed an ambiguous phase map.

The use of dual or multiple wavelengths for hologram recording may greatly reduce the number of discontinuities, since in that case the $2\pi$ ambiguity applies only to the phase difference between the multiple wavelengths. This ambiguity in the phase map results in corresponding ambiguities in dimensions of the imaged object to be derived based on the phase map, since a shift in phase in the phase map may correspond to a shift of any number of integer multiples of the wavelength. Such ambiguities must therefore be resolved, and the true phase shift ascertained without ambiguities, in order to accurately numerically reconstruct the structure of the imaged object based on the phase map.

In order to resolve the phase ambiguities in the phase map generated by step 506, process 500 can include the step of obtaining height data relating to the imaged object from at least one additional image of the imaged object, the height data being obtained with a first precision. As seen at a step 508, the at least one additional image can be a video frame recorded by an incoherent light image acquisition system. The additional image output by step 508 may be a BF and/or DF image acquired under incoherent illumination conditions.

As seen at a step 510, the incoherent light image output at step 508 can be segmented. For example, the imaged object may be a surface having at least one three-dimensional feature thereon. In this case, the incoherent light image of the image object may be segmented, in order to identify the presence and delineate the boundaries of discontinuities in the surface. These discontinuities may correspond to desirable and deliberately formed three-dimensional features on the surface, or to discontinuities in the surface due to defects in the surface. These discontinuities may be termed bumps, although it is understood that the discontinuities may be a protuberance or indentation with respect to the surface having any type of shape, such as curved or rounded or having straight edges.

The incoherent light image may be segmented using appropriate image segmentation techniques. The output of step 510 may be a list identifying the presence and location of bumps in the image. Such a list may be termed a segmented bumps list. It is understood that such a list does not identify the heights of the bumps but rather only the presence and location of the bumps.

As seen at a step 511, the respective heights of the bumps identified in the segmented bumps list output by step 510 are then classified, such as by an AI network. Training of the AI network, such that the AI network is capable of receiving a segmented bumps list and automatically classifying the heights of the bumps therein, is described in further detail henceforth with reference to FIGS. 7 and 8. An AI network can be used to classify bump heights since such a classification approach is rapid, automated and highly efficient. However, the use of an AI network to classify bump heights is not essential and in certain applications the bump heights may be classified using other approaches such as depth from defocus. This may be relevant, for example, in a case where an insufficient volume of training data are available to train the AI network.

The output of step 511 is a classified bump list of bump heights. The AI network can be operative to classify the bump height with a first relatively low precision. For example, the bump height may be classified down to a precision of approximately 7 µm, a precision of approximately 5 µm, or a precision of approximately 3 µm. This precision may be unacceptably poor for classifying discontinuities in the imaged surface. However, this precision is sufficiently precise to be useful for resolving ambiguities in the phase map generated based on the DH data, as is explained further henceforth.

In one possible embodiment of the present invention, shown as a process 600 in FIG. 6, both the segmentation performed at step 510 and the bump height classification performed at step 511 may be augmented by the use of the DH data generated at step 506. In this embodiment, rather than the segmentation and classification of bumps being based only on the incoherent light image acquired at step 508, the segmentation and classification may be assisted by the use of the DH data. This may be advantageous since the DH data is particularly well suited for surface profiling and segmentation.

As seen at a phase ambiguity resolution step 512, the low-precision bump height classification data may then be used to resolve phase ambiguity in the phase map generated at step 506.

Inputs to phase ambiguity resolution step 512 are the DH phase map including phase ambiguities, as generated by processing step 506 of FIG. 5 or FIG. 6, and the segmented and height classified bump list, as generated by processing step 511 of FIG. 5 or FIG. 6. At step 512 an ambiguity resolving decision is applied to the DH phase map based on the segmented and classified bumps list.

For example, a given phase shift arising due to a bump may correspond to a phase difference $\pi/2$, $\pi/2+2\pi$, $\pi/2+4\pi$, etc. Such a phase shift may therefore be termed an ambiguous phase shift, such that the height of the bump at the pixel at which the phase shift is measured, which height is derived based on the phase shift, is also ambiguous. However, at step 512 the low-precision data relating to the bump height may be used to resolve the ambiguity, since the low-precision height data may be used to ascertain which height of the several ambiguous range height possibilities in the phase map corresponds to the low-precision height according to the classified bump list. The bump height may thus be derived with a second high precision based on the phase map, which second precision is more precise than the precision of the low precision classification, and without ambiguities.

Figure 7:
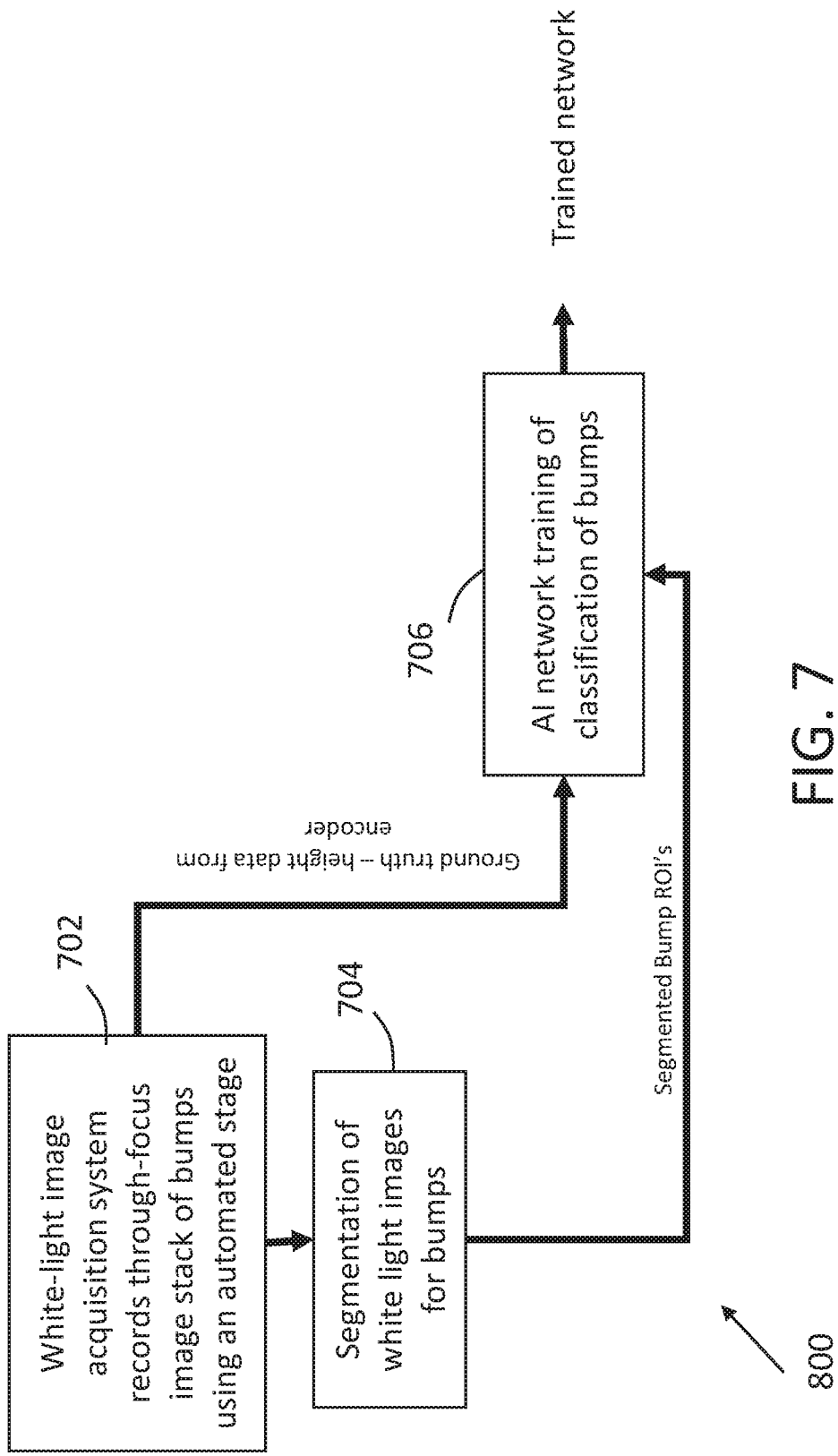
FIGS. 7 and 8 are simplified respective flow charts illustrating training of an AI network employed for the reconstruction of digital holograms in accordance with the embodiments of FIGS. 5 and 6 respectively.
Figure 8:
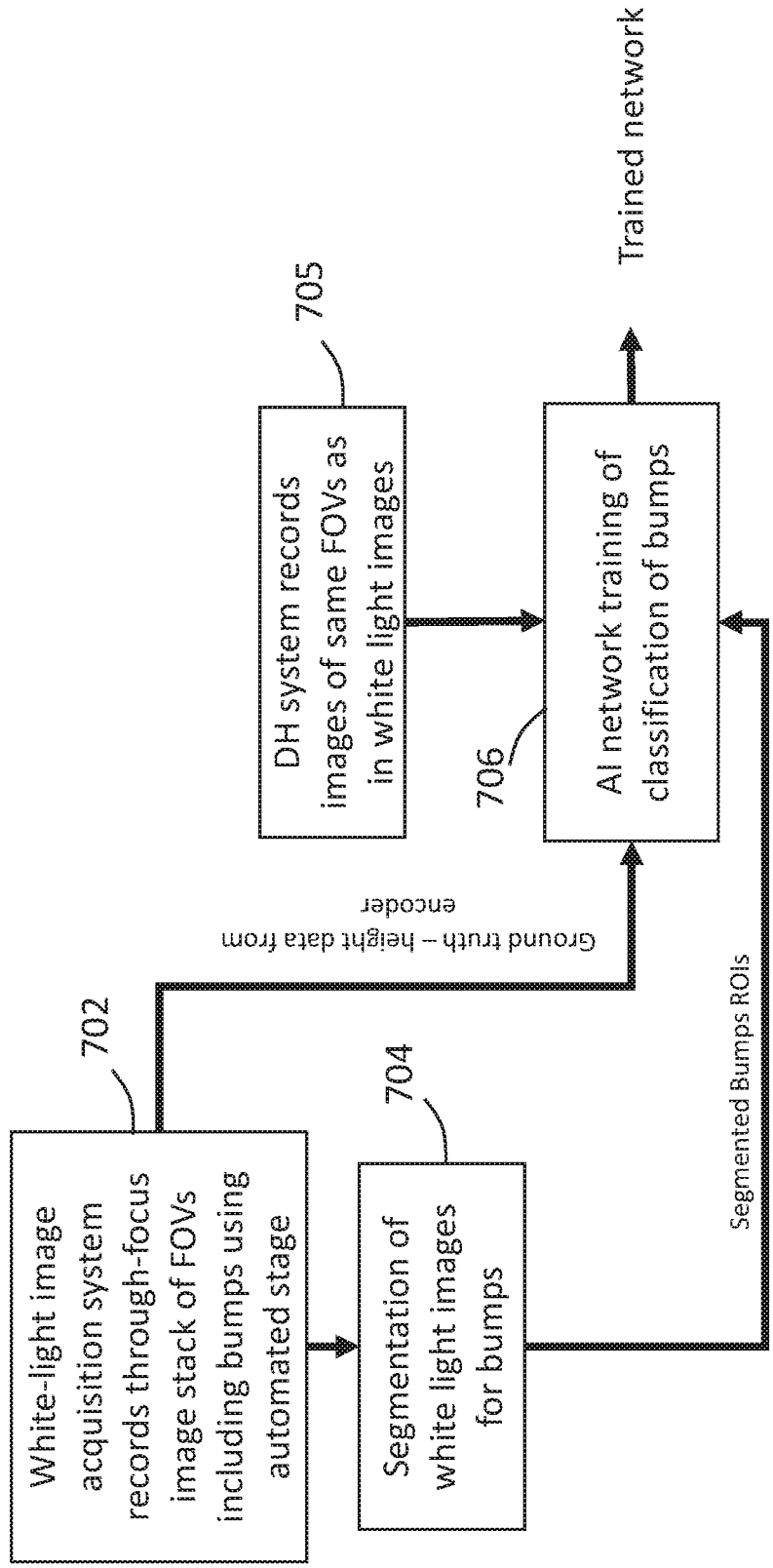

Reference is now made to FIGS. 7 and 8, which are simplified respective flow charts illustrating training of an AI network employed for the reconstruction of digital holograms in accordance with the embodiments of FIGS. 5 and 6 respectively.

As described hereinabove with reference to FIGS. 5 and 6, heights of bumps in a segmented bump list may be generated at step 511 by an AI-network. Such a network must be trained prior to the utilization thereof within process 500 or 600, in order for the network to be capable of automatically carrying out bump height classification. The training of such a network is now described with reference to FIGS. 7 and 8.

Turning now to FIGS. 7 and 8, as seen at a step 702, an incoherent light image acquisition system is operative to record an image stack of a surface including at least one three-dimensional feature, hereinafter referred to as a bump, although it is appreciated that the feature may have any topology. The stack can be recorded at a range of focal distances from the imaged surface, such as by using an automated stage to adjust the distance of the image acquisition device from the imaged surface.

As seen at a step 704, the images are then segmented for bumps. Such image segmentation may be carried out by any appropriate image segmentation technique. The output of training step 704 is a list indicating the presence and location of bumps in each image of the stack of images acquired at step 702.

Turning specifically to FIG. 8, as seen at a step 705 therein, a DH system may optionally additionally record interferograms of the same FOVs of the imaged surface as captured in the incoherent images acquired at step 702. This step 705 is relevant for the training of the AI network only if the AI network is being trained in order to be employed in the embodiment shown in FIG. 6, in which the DH data is used to assist in the image segmentation and classification. Step 705 can be carried out by physically acquiring interferograms of the same FOVs of the imaged surface as captured in the incoherent images acquired at step 702. Step 705 may alternatively be carried out by acquiring a single interferogram of the object to be imaged, reconstructing the wavefront and digitally propagating the wavefront, thereby generating a plurality of images corresponding to a plurality of focal depths in the z direction through the imaged object. Each image of the plurality of images can comprise a multiplicity of pixels. The plurality of images form a stack of coherent light images at a series of depths in the imaged object, corresponding to the incoherent light images obtained at step 702. The depth of the imaged object may be defined as the dimension of the object in the z-direction, where the z-direction is that direction perpendicular to the x- and y-axis defining the object plane.

Turning again to both FIGS. 7 and 8, as seen at a step 706, the AI network is operative to receive the segmented bumps list output at step 704 and, in the case of FIG. 8, the DH data used in assisting the image segmentation and classification. Additionally, the AI network is also provided with the through-focus height position from the encoder, which through-focus height position data represents the ground truth with regards to the true bump height. The ground truth height position data from the encoder is correlated with images taken at steps of known distances in the z-direction. Based on these images, a best focus image with respect to each bump may be found, for example by DFF or by a human operator. Next, the AI network is trained at step 706 to classify the height of the bumps in the segmented bumps list, can be based on the appearance thereof in the incoherent light images. Due to the controlled and precise through-focus movement, images of the bump are available to the AI network at multiple and precisely known out-of-focus positions. The network is thus trained to produce an estimator of the bump height based on the appearance thereof within a single arbitrarily focused video frame as shown at FIGS. 5 and 6.

By way of example, the AI network may be trained on about 10,000 samples, divided into a training set and validation set. The validation set includes samples that are unseen by the network during training. The training set may make up approximately 80% of the samples and the validation set approximately 20%. The network training may be stopped based on at least one of the following criteria: that no further improvement of error (MSE) reduction is achieved upon further training; that overfitting occurs; that a maximum training epoch is achieved. A large variety of network types may be suitable for use. In general, a network suitable for use includes convolutions blocks, data reduction layers and activation/normalization methods.

Figure 9:
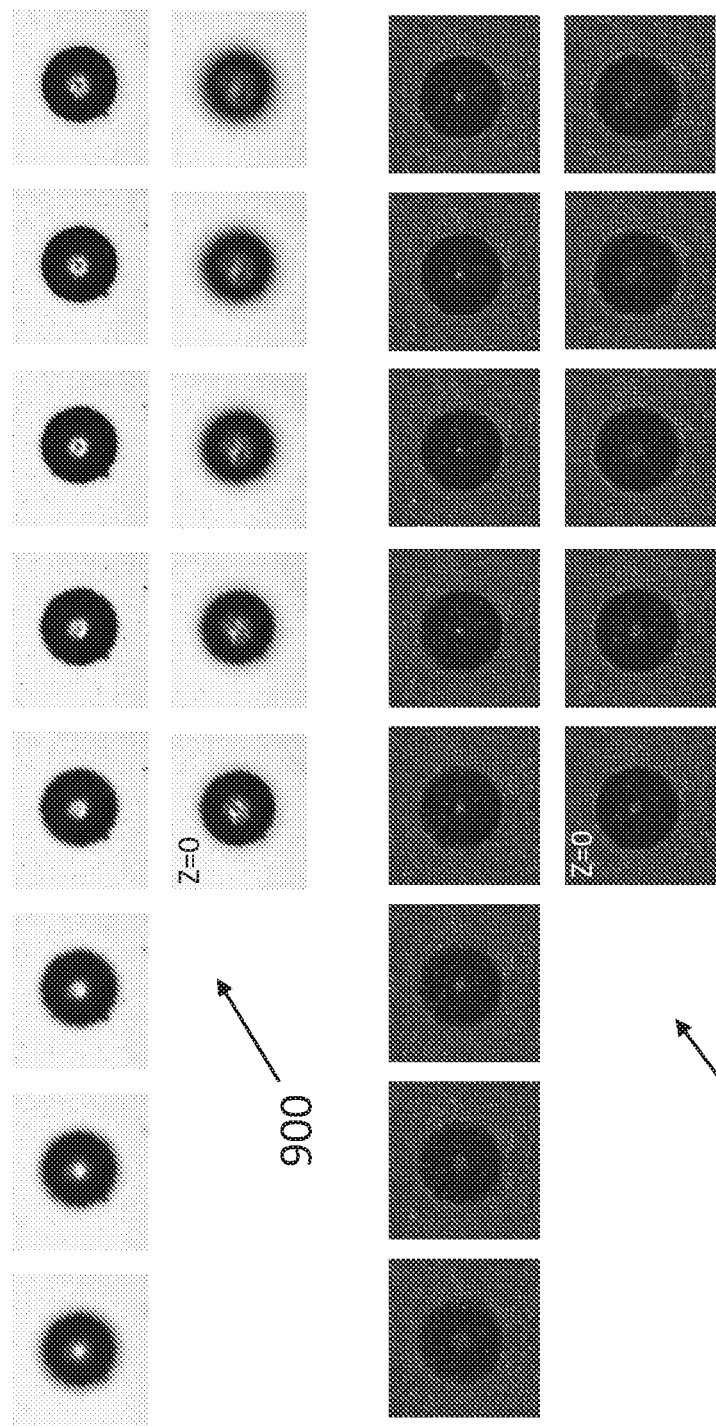
FIG. 9 shows simplified images obtained in the training of an AI network in accordance with FIGS. 7 and 8.

An example of an image stack of a bump on an imaged surface at a series of focal distances is shown in FIG. 9. A set of images of a bump at various depths in the z-direction as actually acquired by an incoherent light imaging device is shown in a first image set 900. The distance in the z-direction between the images is 5 µm in this example. Such a set of images may be generated by training step 702 of FIG. 7 or 8. A corresponding set of images of the same FOVs as shown in image set 900 as acquired by a DH imaging system, in which the images at various depths are generated by wavefront propagation in the z-direction, is shown in a second image set 902. Such as set of images may be generated by step 705 of FIG. 8.

It is noted that main differences among the various embodiments described hereinabove lie in the potentially better adaptability thereof to various application scenarios with a given amount of system resources, rather than the theoretical performance parameters thereof. Adaptability in this case refers to the ability to generate satisfactory 3D profiling having fewer noise and signal drop-off artifacts. To illustrate, the system of FIG. 2 is expected to improve over that of FIG. 1 for certain applications, at the expense of having to train an AI network. The system of FIG. 3 improves further at the expense of an auxiliary incoherent illuminator. The systems of FIGS. 5 and 6 may perform faster since the wavefront is not propagated, at the expense of more complex AI training process and possibly inferior 3D profiling performance.

Reference is now made to FIG. 10, which is a simplified partially pictorial, partially block diagram illustration of a system for acquisition and reconstruction of digital holograms, constructed and operative in accordance with an embodiment of the present invention, for performing the steps included in the processes of any of FIGS. 1-8.

As seen in FIG. 10, there is provided a system 1000 for the reconstruction of digital holograms. System 1000 includes a digital holographic (DH) image acquisition subsystem 1002 operative for acquiring a digital hologram of an object here shown, by way of example, to be a surface 1004 having at least one three-dimensional feature 1006 formed thereon. Surface 1004 is an electronic device such as a wafer, PCB or FPD and system 1000 is particularly well suited for the reconstruction of DHs thereof.

DH image acquisition subsystem 1002 can include a source of coherent light of at least one wavelength, here shown to be embodied, by way of example, as a fiber coupled laser 1010. A laser output of fiber coupled laser 1010 is delivered to a first reference arm or fiber 1012 and a second sample arm or fiber 1014. The laser light travelling through reference fiber 1012 acts as a reference beam. The laser light travelling through sample fiber 1014 impinges on the surface 1004 and then interferes with the reference beam in order to create an interference pattern or interferogram. An example of a fiber coupled laser useful in system 1000 is IBEAM-SMART-488-S-HP operating at wavelengths of 488, 520 and 532 nm, commercially available from Toptica of Graefelfing, Germany. Although a fiber coupled laser light source is shown in FIG. 10, system 1000 may also operate with a more conventional free-space laser light source, illustrated as a DHM free space input 1016.

Laser light emerging from reference fiber 1012 passes through a first collimator 1020, a delay line 1022 and a beam splitter 1024. Part of the reference laser light is reflected by beam splitter 1024 towards a camera 1026. Camera 1026 can be capable of imaging DH images and/or incoherent light images. The functionality of camera 1026 may be divided between more than one camera, such that camera 1026 may include a DH camera and a separate white light camera. Alternatively, the functionalities may be combined in a single camera. An example of a camera useful in system 1000 is UI-3880CP-M-GL Rev.2, commercially available from IDS of Obersulm, Germany.

Laser light emerging from sample fiber 1014 passes through a second collimator 1030, a beam splitter 1032, a condenser 1034, and another beam splitter 1036. At beam splitter 1036, the laser light is reflected towards surface 1004, through a microscope objective 1038.

Light reflected by surface 1004 propagates back towards microscope objective 1038, and from there travels via beam splitter 1036 through a tube lens 1040 towards beam splitter 1024 and camera 1026. Light reflected from surface 1004 travels along an optical axis A, along which optical axis A a height of surface 1004 is measured by system 1000. Light diffracted by surface 1004 thus interferes with reference laser light not having impinged on the surface 1004, and the interference pattern or interferogram created thereby is imaged by camera 1026.

The interferogram acquired at camera 1026 can be provided to an image processing module 1050. Image processing module 1050 can include a wavefront reconstructor unit 1052, a phase map generator unit 1054, an image analyzer unit 1056, a phase ambiguity resolver unit 1058 and a feature height calculator unit 1060.

Wavefront reconstructor unit 1052 can be operative to reconstruct a wavefront based on the digital hologram acquired by camera 1026. The wavefront may be reconstructed by techniques such as Fourier and convolutional reconstruction. Phase map generator unit 1054 can be operative to receive the wavefront generated by wavefront reconstructor unit 1052 and to generate a phase map of surface 1004 including features 1006 thereon based on the wavefront. As explained hereinabove, such a phase map typically includes discontinuity artefacts giving rise to phase ambiguities due to the wrapping of the phase, such that a shift in phase may be attributed to one of a possible range of wavelength multiples. The ambiguity in the phase map may be reduced although not eliminated by system 1002 operating at more than one wavelength, such as at two or more wavelengths.

In order to resolve such ambiguities, and thus to allow unambiguous derivation of the height of three-dimensional features 1006 on surface 1004 giving rise to the phase shifts encoded in the phase map, system 1000 may include an additional imaging modality 1070. Additional imaging modality 1070 can be embodied as an incoherent light illuminator 1070. Light from incoherent light illuminator 1070 can propagate towards beam splitter 1032, whereat the light is reflected towards condenser 1034 and reflected towards surface 1004 by beam splitter 1036 through microscope objective 1038. Light reflected by surface 1004 propagates back towards microscope objective 1038, and from there travels via beam splitter 1036 through a tube lens 1040 towards beam splitter 1024 and camera 1026, which records a white-light image.

Image analyzer 1056 can be operative to obtain height data relating to three-dimensional feature 1006 from at least one additional image of surface 1004. The at least one additional image may comprise at least one image obtained by the additional imaging modality 1070, in accordance with the process outlined with reference to FIG. 2, 3 or 6 above. The at least one additional image may alternatively not be an image obtained by additional imaging modality 1070, but rather additional DH images obtained by propagating the wavefront derived by wavefront reconstructor unit 1052 through a series of depths within surface 1004, as described with reference to FIG. 1.

Irrespective of the particular type of additional image employed, the height data obtained from the additional image is provided to phase ambiguity resolver 1058. Phase ambiguity resolver 1058 is operative to resolve phase ambiguities in the phase map output by phase map generator 1054 based on the height data provided by image analyzer 1056. The height data provided by image analyzer 1056 can be of a first, relatively poor precision, which precision is however sufficiently precise to be used in resolving ambiguities in the phase map.

Feature height calculator 1060 can be operative to derive a height of at least one three-dimensional feature 1006 based on said phase map following the resolving of the phase ambiguities therein. The height of three-dimensional feature 1004 derived based on the phase map is derived with a second precision, more precise than the first precision of the height data output by image analyzer 1056.

Image processing module 1050 typically comprises at least one programmable processor, which is programmed in software and/or firmware to carry out the functions that are described herein, along with suitable digital and/or analog interfaces for connection to the other elements of system 1000. Alternatively or additionally, image processing module 1050 comprises hard-wired and/or programmable hardware logic circuits, which carry out at least some of the functions of the image processing module 1050. Although image processing module 1050 is shown in FIG. 10, for the sake of simplicity, as a single, monolithic functional block, in practice the image processing module 1050 may comprise multiple, interconnected control units, with suitable interfaces for receiving and outputting the signals that are illustrated in the figures and are described in the text. Program code or instructions for the image processing module 1050 to implement various methods and functions disclosed herein may be stored in readable storage media, such as a memory in the image processing module 1050 or other memory.

Figure 11:
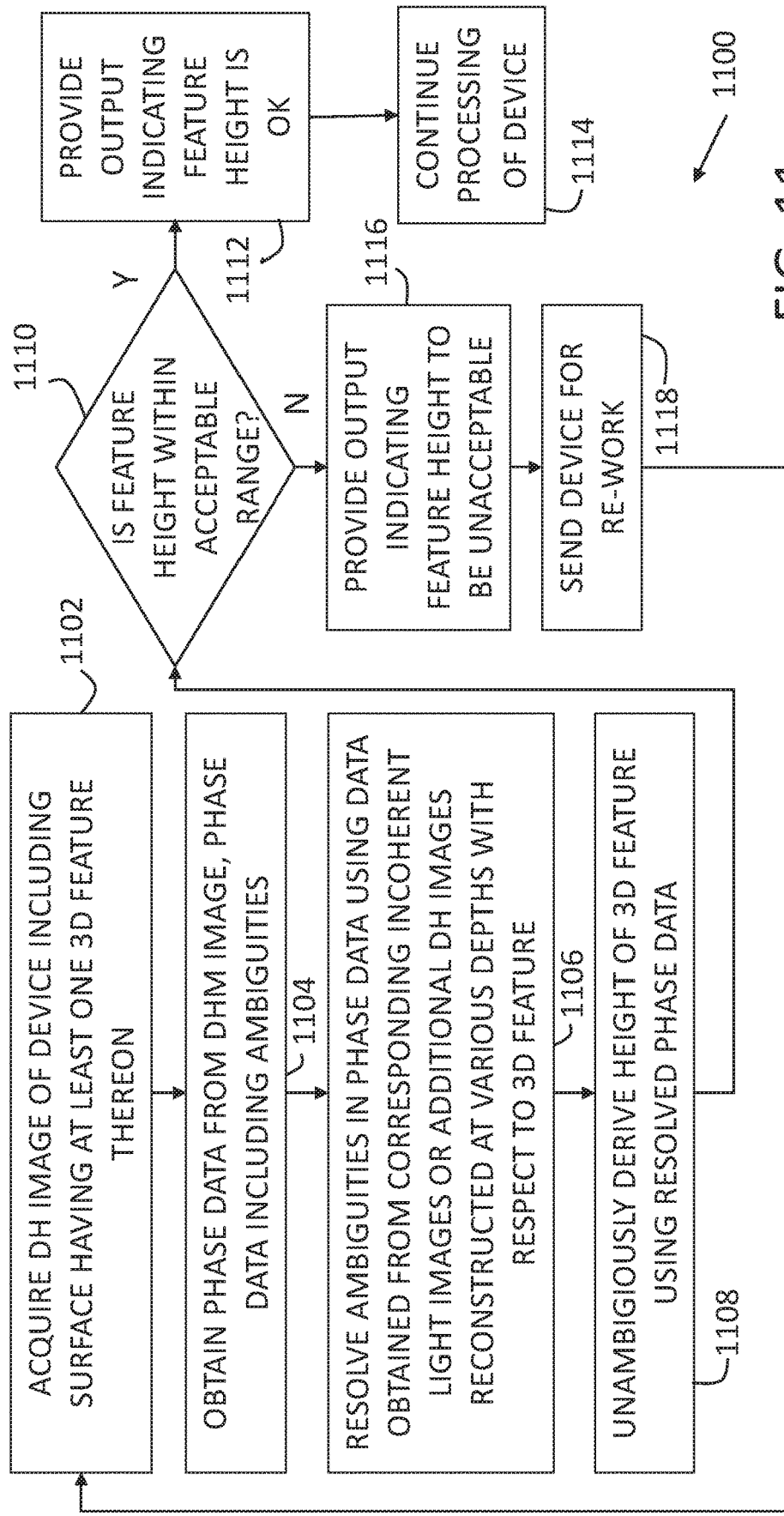
FIG. 11 is a simplified flow chart illustrating a possible implementation of the system of FIG. 10, in accordance with an embodiment of the present invention.

FIG. 11 is a simplified flow chart illustrating a possible implementation of the system of FIG. 10, in accordance with an embodiment of the present invention.

As seen in FIG. 11, an implementation of the system of FIG. 10 may be represented in the form of a process 1100. Process 1100 corresponds to a possible implementation of the system of the present invention, in a case that the system of the present invention is used as an inspection and/or automated repair system. Such an inspection system may be useful, for example, for inspecting electronic devices during or following the manufacture thereof in order to identify the presence of defects and/or evaluate whether features of the device are formed in accordance with predetermined requirements. An exemplary application is an automated system for optical inspection and repair of printed circuit boards (PCB) for open or short circuit defects. A 3D profiling system is used to close the automated repair loop. It is appreciated, however, that the method shown in chart 1100 is not limited to application to the inspection of electronic devices and may be used in a variety of other contexts, for the 3D profiling of other types of items such as thick biological samples.

As seen at a first step 1102, a DH image or interferogram of a device including a surface having at least one 3D feature thereon is acquired. For example, the DH image may be a digital holographic microscopy image, such as that acquired by DH image acquisition subsystem 1002 shown in FIG. 10.

As seen at a second step 1104, phase data is obtained from the interferogram. The phase data can be obtained by reconstruction of a wavefront based on the interferogram and subsequent processing of the wavefront in order to generate a phase map. The wavefront may be computationally reconstructed, for example by wavefront reconstructor unit 1052 of FIG. 10. The phase map may be generated based on the reconstructed wavefront, for example by phase map generator unit 1054 of FIG. 10. The phase map can include amplitude and phase information per pixel of the interferogram.

The phase map typically includes phase ambiguities, which phase ambiguities arise from phase wrapping. In order to unambiguously interpret the phase map and derive unambiguous data relating to the height of the features on the surface causing the measured shifts in phase, these phase ambiguities must be resolved.

As seen at a third step 1106, the phase ambiguities can be resolved by using height data obtained from corresponding incoherent light images of the surface or obtained from DHM images generated by propagating the wavefront through various depths with respect to the surface. The height data may be termed coarse height data, meaning that it has a precision that is poorer than the precision of the height data directly obtainable from the interferogram. However, the precision of the height data is sufficient to resolve phase ambiguities. The height data may be obtained, for example, by an image analyzer unit 1056 of FIG. 10. The phase ambiguity may be resolved based on the height data, for example by a phase ambiguity resolver unit 1058 in FIG. 10. The phase ambiguity may be resolved in accordance with the process of FIG. 1 or in accordance with the process of FIG. 2, or in accordance with the process of FIG. 3, or in accordance with the process of FIG. 5 or of FIG. 6, each as described hereinabove.

As seen at fourth step 1108, once the ambiguities in the phase data are resolved, the phase data may be used to derive the height of the features on the imaged surface. For example, the feature height may be found by feature height calculator unit 1060 of FIG. 10.

As seen at a fifth step 1110, process 1100 may then ascertain whether the derived feature height is within an acceptable predetermined range or threshold. If so, a human sensible output may be provided at a sixth step 1112 indicating that the height of features on the imaged surface is acceptable and processing of the device may proceed in an uninhibited way, as seen at a seventh step 1114. It is understood that the provision of a human sensible output at sixth step 1110 is optional and in some cases may not be required.

If the feature height is found to be outside of the acceptable predetermined range or threshold an output may be provided indicative of this, as seen at an eighth step 1116. Appropriate corrective action may then be taken, as seen at a ninth step 1118. Appropriate corrective action may include sending the device for re-work to correct the feature formation. In some cases, the device may be disposed of, if correction is not worthwhile. In the case that the device is re-worked, the device following re-work may be re-imaged, as at first step 1102. It is understood that the provision of a human sensible output at eighth step 1116 is optional and in some cases may not be required.

It will be appreciated by persons skilled in the art that the present invention is not limited to what has been particularly shown and described hereinabove. The scope of the present invention includes both combinations and subcombinations of various features described hereinabove as well as modifications thereof, all of which are not in the prior art.

What is claimed is:

1. A method for reconstructing a digital hologram comprising:
    acquiring a digital hologram of a surface having at least one three-dimensional feature thereon;
    reconstructing a wavefront based on said digital hologram;
    generating a phase map of at least a portion of said surface based on said wavefront, said phase map including phase ambiguities;
    obtaining at least one additional image of said surface, wherein said obtaining at least one additional image of said surface comprises employing an AI network to generate a series of incoherent light images corresponding to a series of digital wavefronts of said surface, said series of digital wavefronts being obtained by digitally propagating said wavefront through a series of depths within said surface and obtaining said series of digital wavefronts corresponding to said series of depths;
    obtaining height data relating to said three-dimensional feature from said at least one additional image of said surface, said height data being obtained with a first precision;
    resolving said phase ambiguities based on said height data; and
    deriving a height of said at least one three-dimensional feature based on said phase map following said resolving of said phase ambiguities therein, said height being derived with a second precision more precise than said first precision.

2. The method according to claim 1, wherein said obtaining height data comprising employing DFF algorithms to obtain height data based on said series of digital wavefronts.

3. The method according to claim 1, wherein said obtaining height data comprises employing DFF algorithms to obtain height data based on said series of incoherent light images.

4. The method according to claim 1, wherein said obtaining height data comprises employing said AI network to automatically obtain height data based on segmentation and classification of said at least one three-dimensional feature.

5. The method according to claim 1, wherein said first precision is in a range of 1~5 μm.

6. The method according to claim 5, wherein said second precision is in a range of 1~100 nm or 50~1000 nm.

7. The method according to claim 1, wherein said acquiring said digital hologram comprises acquiring a digital microscopic hologram.

8. A system for reconstructing a digital hologram comprising:
    a digital holographic image acquisition subsystem operative for acquiring a digital hologram of a surface having at least one three-dimensional feature thereon;
    a wavefront reconstructor operative to reconstruct a wavefront based on said digital hologram;
    a phase map generator operative to receive said wavefront and to generate a phase map of at least a portion of said surface based on said wavefront, said phase map including phase ambiguities;
    an image processing subsystem operative to obtain at least one additional image of said surface, wherein said image processing subsystem comprises an AI network operative to generate a series of incoherent light images corresponding to a series of digital wavefronts of said surface, said series of digital wavefronts being obtained by said image processing subsystem digitally propagating said wavefront through a series of depths within said surface and obtaining said series of digital wavefronts corresponding to said series of depths;
    an image analyzer operative to obtain height data relating to said three-dimensional feature from said at least one additional image of said surface, said height data being obtained with a first precision;
    a phase ambiguity resolver operative to resolve said phase ambiguities in said phase map based on said height data; and
    a height calculator operative to derive a height of said at least one three-dimensional feature based on said phase map following said resolving of said phase ambiguities therein, said height of said three-dimensional feature being derived with a second precision more precise than said first precision.

9. The system according to claim 8, wherein said image analyzer is operative to employ DFF algorithms to obtain said height data based on said series of digital wavefronts.

10. The system according to claim 8, wherein said image analyzer is operative to employ DFF algorithms to obtain said height data based on said series of incoherent light images.

11. The system according to claim 8, wherein said image analyzer comprises an AI network operative to automatically obtain height data based on segmentation and classification of said at least one three-dimensional feature.

12. The system according to claim 8, wherein said first precision is in a range of 0.5~5 μm.

13. The system according to claim 12, wherein said second precision is in a range of 1~100 nm or 50~1000 nm.

14. The system according to claim 8, wherein said digital holographic image acquisition subsystem is a digital holographic microscopic image acquisition subsystem.

\* \* \* \* \*